United States Patent [19]
Gerry

[11] 4,168,692
[45] Sep. 25, 1979

[54] MULTIPLE ENERGY MODULATION IGNITION SYSTEM

[76] Inventor: Martin E. Gerry, 13452 Winthrope St., Santa Ana, Calif. 92705

[21] Appl. No.: 868,118
[22] Filed: Jan. 9, 1978

Related U.S. Application Data

[63] Continuation-in-part of Ser. No. 812,912, Jul. 5, 1977.

[51] Int. Cl.² ............................ F02P 3/02; F02P 3/04
[52] U.S. Cl. ............................. 123/148 E; 123/148 B
[58] Field of Search ..... 123/148 AC, 148 B, 148 DS, 123/148 E; 315/209 CD

[56] References Cited

U.S. PATENT DOCUMENTS

| 2,905,831 | 9/1959 | Scott | 123/148 B |
| 3,206,614 | 9/1965 | Wright | 123/148 E |
| 3,386,000 | 5/1968 | Farr | 123/148 E |
| 3,780,717 | 12/1973 | Rakitch | 123/148 B |
| 3,897,767 | 8/1975 | Gordon et al. | 123/148 E |

Primary Examiner—Charles J. Myhre
Assistant Examiner—P. S. Lall

[57] ABSTRACT

A muliple energy modulated ignition system having a transient signal provided by precharging an ignition transformer primary winding modulated by a non-DC power source, to provide high energy firing levels to igniters in the ignition transformer secondary circuit. Several versions of the timer and method of interconnecting the timer to the ignition transformer primary and to an output winding of the non-DC power source, are disclosed.

11 Claims, 10 Drawing Figures

Equivalent Circuit (1)

Inductor Charge & Discharge Periods for 8 Cyl. Engine at 6000 RPM

Charge Period = $1.67 \times 10^{-3}$ seconds
Discharge Period = $0.833 \times 10^{-3}$ seconds (2)

Rectangular Voltage Wave $v_1(t)$ $u$ is a unit step
$4k$ is a complete cycle (3)

$$v_1(t) = V_1\left[u(t) + 2\sum_{n=1}^{\infty}(-1)^n u(t-2nk)\right]$$

$$v_1(s) = \frac{V_1}{s}\tanh ks \cong \frac{V_1}{s}(1 - 2e^{-2ks} + 2e^{-4ks})$$

Step Function Voltage Wave $v_0(t)$

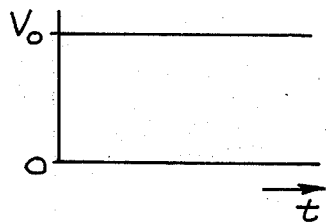

$$v_0(t) = V_0 [u(t)]$$
$$v_0(s) = \frac{V_0}{s} \quad (4)$$

where $u$ is a unit step

Typical Parameter Values of Circuit (1)

$V_0 = 12$ volts  $L_1 = 10$ millihenries
$V_1 = 300$ volts  $L_2 = 20$ millihenries  (5)
$C = 0.2$ microfarads  $R_1 = 1.4$ ohms
 $R_2 = 2$ ohms Solution for Current $i_1(t)$ due to $v_1(t)$ $$v_1(s) = \left[(L_1+L_2)s + (R_1+R_2) + \frac{1}{Cs}\right] I_1(s)$$

where $s$ is a complex number showing that the parameter of which it is part of is written in Laplace transform notation $I_1(s)$ is the Laplace transform of current $i_1(t)$ $L_1$ is inductance at primary 31
$R_1$ is series resistance of primary 31
$L_2$ is inductance at output 25
$R_2$ is series resistance of 25
$C$ is capacitor 40
$P$ is contactor pair in circuit (1)
$V_1$ is output peak-to-peak voltage across 25
$V_0$ is voltage of battery 10
$L = L_1 + L_2 \;;\; R = R_1 + R_2$  (6)

Fig. 7b.

$$I_1(s) = \frac{\frac{V_1}{s}(1 - 2e^{-2ks} + 2e^{-4ks})}{Ls + R + \frac{1}{Cs}} \tag{7}$$

$i_1(t) =$ The inverse Laplace transform of $I_1(s)$ $\tag{8}$ $$= V_1\sqrt{\frac{C}{L}} e^{-\frac{R}{2L}t}\left[\sin\frac{1}{\sqrt{LC}}t - 2e^{\frac{kR}{L}}\sin\frac{(t-2k)}{\sqrt{LC}} + 2e^{\frac{2kR}{L}}\sin\frac{(t-4k)}{\sqrt{LC}}\right]$$

Solution for Current $i_o(t)$ due to $V_o(t)$
(During discharge of $L_1$ when points P are opened)

$$\frac{V_o}{s} = (Ls + R + \frac{1}{Cs})I_o(s) \tag{9}$$

$$I_o(s) = \frac{V_o}{L}\left[\frac{1}{s^2 + \frac{R}{L}s + \frac{1}{LC}}\right] \tag{10}$$

$$i_o(t) = V_o\sqrt{\frac{C}{L}} e^{-\frac{R}{2L}t} \sin\frac{1}{\sqrt{LC}}t \tag{11}$$

The Total Current $$i(t) = i_1(t) + i_o(t)$$

$$i(t) = (V_1 + V_o)\sqrt{\frac{C}{L}} e^{-\frac{R}{2L}t}$$

$$\times \left[\sin\frac{1}{\sqrt{LC}}t - 2e^{\frac{kR}{L}}\sin\frac{(t-2k)}{\sqrt{LC}} + 2e^{\frac{2kR}{L}}\sin\frac{(t-4k)}{\sqrt{LC}}\right] \tag{12}$$

Fig. 7c.

Due to positive exponential terms in (12), the current $i(t)$ may be approximated as:

$$i(t) \cong (V_1+V_0)\sqrt{\frac{C}{L}} \, e^{-\frac{R}{2L}t}$$

$$\times \left[-2e^{\frac{kR}{L}}\sin\frac{(t-2k)}{\sqrt{LC}} + 2e^{\frac{2kR}{L}}\sin\frac{(t-4k)}{\sqrt{LC}}\right]$$

(13)

By Faraday's Law of Induction $$e(t) = -L\frac{di}{dt} \qquad (14)$$

Differentiating (13) and multiplying by $-L$ $$e(t) \cong -\frac{4k(V_1+V_0)}{L} e^{-\frac{R}{2L}t}$$

$$\times \left[e^{\frac{kR}{L}}\cos\frac{(t-2k)}{\sqrt{LC}} - 2e^{\frac{2kR}{L}}\cos\frac{(t-4k)}{\sqrt{LC}}\right]$$

(15)

The modulation voltage across $L_1$ (primary 31)

$$e(t)\Big|_{mod} = e(t) + \frac{[e(t)]^2}{2!} + \frac{[e(t)]^3}{3!} + \dots \quad (16)$$

Fig. 7d.

MULTIPLE ENERGY MODULATION IGNITION SYSTEM

RELATED PATENT APPLICATIONS

This application is a continuation-in-part of application Ser. No. 812,912, filed July 5, 1977 and copending therewith.

BACKGROUND OF THE INVENTION

This invention is in the field of ignition systems and more particularly in high energy ignition systems providing a plurality of intermodulated waveforms.

No art is known to exist with respect to the intermodulated ignition systems of the type using a basic Kettering circuit modulated by non-DC power.

SUMMARY OF THE INVENTION

An ignition system, comprises the combination of a transformer having a primary winding and a secondary winding, a non-DC power source serially coupled with the primary winding, a capacitor serially coupled to the power source, and means intermittently connected to the power source for providing a modulated transient ignition voltage at the secondary winding.

Said means comprises a timer for intermittently deenergizing the primary winding and intermittently short circuiting the power source output and capacitor during operative mode of the system.

The timer comprises a driven electrically conductive wheel having electrically insulative segments integral with and regularly positioned at the periphery of the wheel, and an electrical contactor in slidable cooperation with the wheel periphery.

The timer may be provided with means for intermittently energizing the power source during said operative mode.

Such timer may have a first electrical contactor in slidable cooperation with the wheel periphery, and a second electrical contactor spaced from the first contactor in slidable cooperation with said wheel periphery.

The timer may also be provided with the capability of intermittently deenergizing the primary winding by differently positioning the appropriate contactor thereby intermittently short circuiting the capacitor and intermittently energizing the power source during said operative mode.

The timer may also provide the function of intermittently deenergizing the primary winding, intermittently short circuiting the power source and capacitor and intermittently deenergizing the power source during said operative mode.

Such timer may be relegated to the function of intermittently deenergizing the primary winding, intermittently short circuiting only the capacitor and intermittently deenergizing the power source during said operative mode.

BRIEF DESCRIPTION OF THE DRAWINGS

FIGS. 7a–7d. constitute the equivalent circuit applicable to FIGS. 1–5.

DETAILED DESCRIPTION

Figure 1:
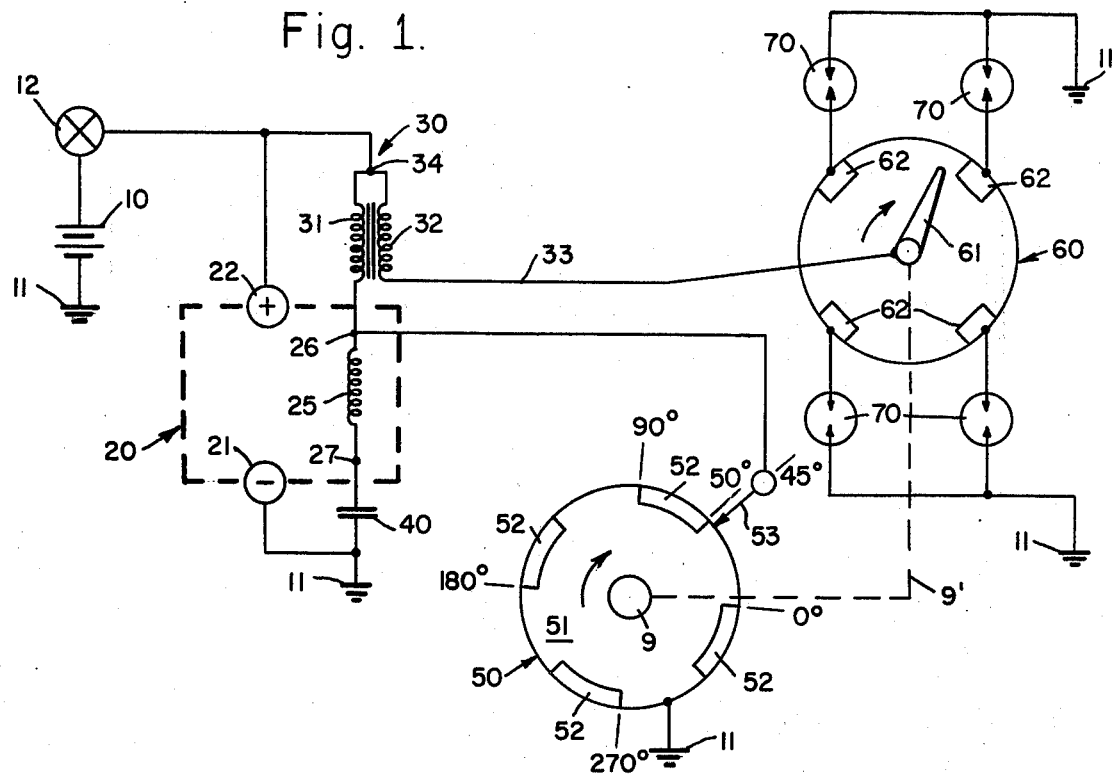
FIG. 1 is a schematic of one configuration of the ignition system according to the invention.
Figure 6:
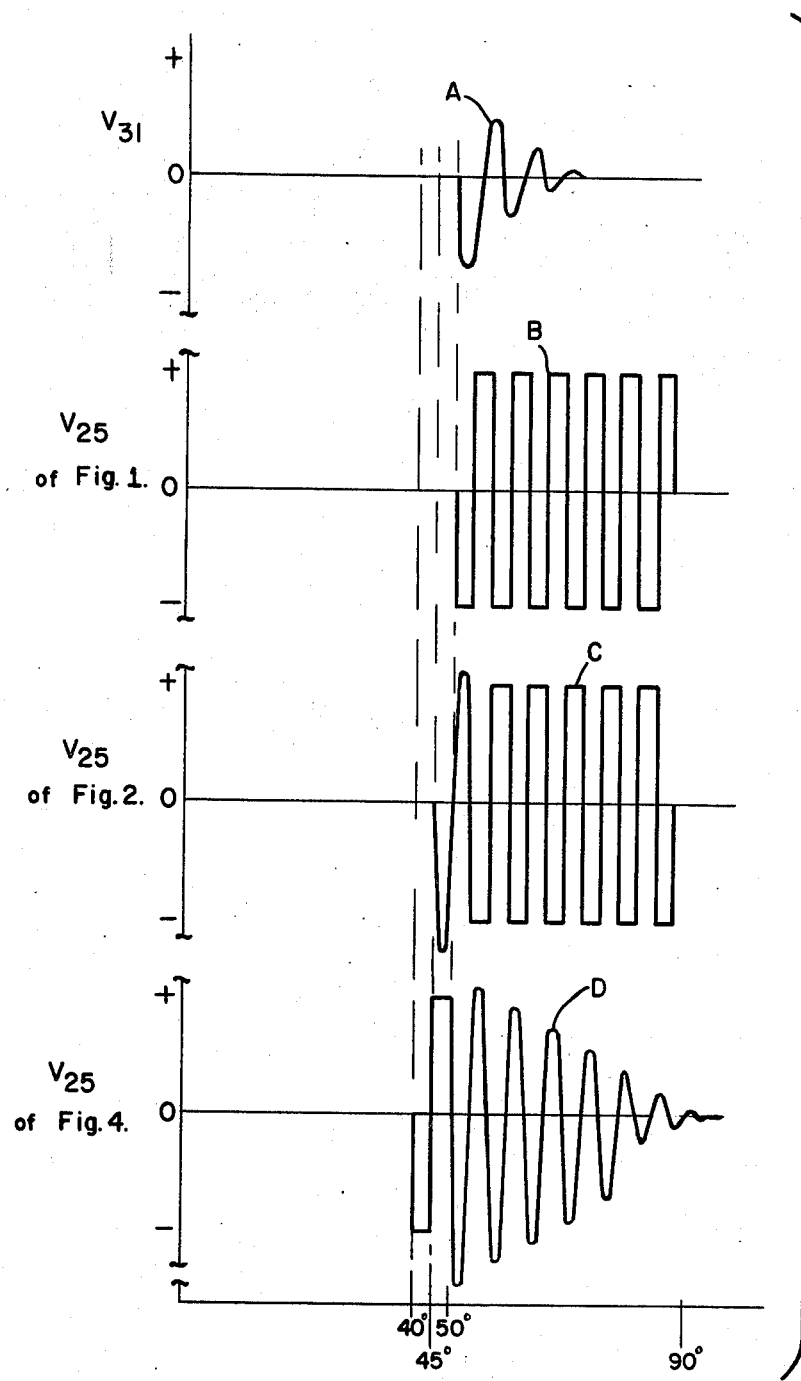
FIG. 6 constitutes a group of waveform diagrams showing the approximate several perturbations obtainable for intermodulation in the several forms of the structures herein identified.
Figure 7A:
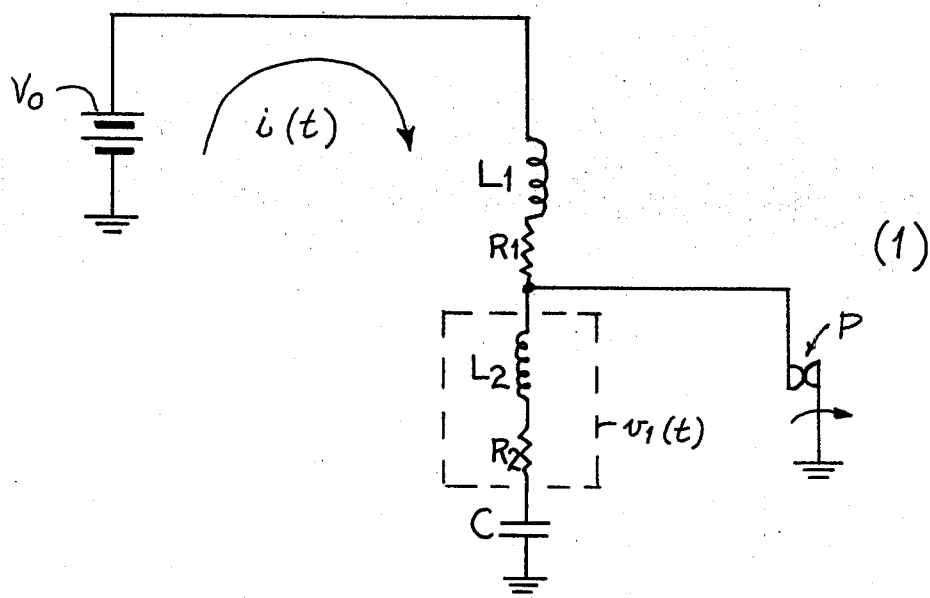
Figure 7A:
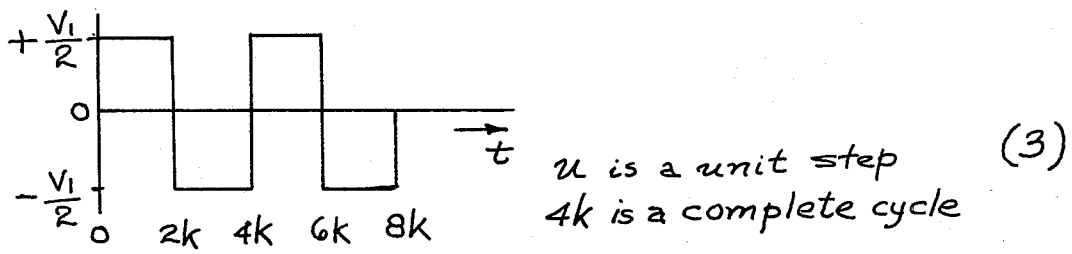

Referring to FIG. 1 and waveforms A and B of FIG. 6, the structure and function of a multiple energy modulation system is illustrated.

A shaft as at 9, at the same electric potential, generally at ground potential in most automobiles, drives a disk of a timer and an arm of a distributor, symbolically illustrated by mechanical shaft linkage or coupling 9' to couple and synchronize timer disk and distributor arm. The distributor arm is electrically insulated from ground, from shaft 9 and linkage 9'. Ground is illustrated symbolically by numeral 11 and is understood to be the electrical return path wherever such path is not shown as being a hard-wire connection.

Battery 10 is connected through ignition switch 12 to the DC positive input terminal 22 of a non-DC power source 20, whereas its DC negative terminal 21 as well as the negative battery terminal are each at ground potential 11. DC power is also fed from switch 12 to one side of a conventional ignition transformer 30 at a junction point 34 of its primary winding 31 and its secondary winding 32.

The other side of primary winding 31 is connected to a junction point 26 of an output winding 25 of an output or coupling transformer of non-DC power source 20, and the other side of winding 25 is connected to a junction point at 27 to which one side of capacitor 40 is connected, the other side of a capacitor 40 being at ground potential 11.

The winding 25 and hence power source 20 is in series connection with transformer primary 31 and capacitor 40. Power source 20 may have a rectangular wave output therefrom though other waveforms are possible, if desired. Power source 20 will generally be a transistor type power generator having waveform repetition rates ranging between 2KHz and 10 KHz, and be transformer coupled, through other coupling instead of the output transformer of which winding 25 is illustrated, may be used if desired. A schematic of the circuit comprising power source 20 and details as to its operation is old in the art, and for example may be found in Bulletin TC-101B, entitled Tape Wound Cores, published by Arnold Engineering Company of Marengo, Illinois, at pages 45 and 46 and including FIG. 22 thereof, and a copy of such bulletin is available in the Search Room of the United States Patent and Trademark Office, such bulletin being copyrighted in 1972 by Arnold Engineering Company.

Junction point 26 is connected by wire to an electrical contactor 53 cooperating with the periphery wheel or disk as at 51 of timer 50, driven in a clockwise direction as illustrated by the arrow thereon. Timer 50 comprises an electrically conductive member or disk 51 having regularly spaced electrically insulative members 52 at the disk periphery, on the basis of generally having the same number of insulative members as there are igniters or cylinders of an engine, although this arrangement can be altered by having a different number of insulative members not corresponding with the number of igniters or engine cylinders, if desired.

It may be seen that in this illustration, and for convenience of discussion, a four cylinder ignition system is contemplated with timer 50, and disk 51 thereof has four insulating members 52 at its periphery positioned between 50°–90°, 140°–180°, 230°–270° and 320°–360°(0°). Therefore, the spacing between these insulating members will in this case be 50°. Hence in conventional automotive terminology, the dwell angle, which is the angle of the energy distribution cycle during which time transformer primary 31 is charged with DC applied thereto intermittently by timer action, will be for a period of 50° duration.

Contactor 53, in slidable continuous cooperation with the wheel periphery is shown in the drawing positioned at a 45° point, just 5° before such contactor will be in cooperation with insulating member 52. Hence during the period 0°–40°, primary winding 31 had been receiving charge from battery 10 and will continue to receive such charge for another 5° up to the 50° point on disk 51, since the timer 50 during such period provides the electrical return path to ground 11 for primary 31 through the substance of electrically conductive disk material comprising disk 51, inasmuch as shaft 9 in continuous cooperation with the electrically conductive material of disk 51, is always at ground potential 11.

Consequently, waveform A, which represents the transient voltage across primary 31, will not begin its excursions or perturbations until the 50° point has been reached, which perturbations will decay rapidly before the 90° point of the disk is opposite contactor 53. Waveform A may be more correctly stated as the transient voltage response across primary 31 upon a disconnect action of the DC electrical power from the system.

During the period represented by angular position 0°–50° of the disk of timer 50, the connection of contactor 53 to junction 26 will also provide an electrical path for current to flow in a circuit involving only the non-DC power source 20 at its output winding 25 and capacitor 40, so that capacitor 40 during such period will act as a load on the output of source 20 at output terminals 26–27, since during such period source 20 is also energized and providing a non-DC waveform output, but during such period the current due to source 20 is inhibited from flowing in winding 31 by virtue of the timer connection just described. However, during such period, some initial charge conditions, due to the non-DC waveform output of source 20, will be established in output winding 25 and capacitor 40.

Hence upon disk 51 being driven to where contactor 53 (at the 50° location) is in cooperation with insulating member 52, ground 11 is removed from junction 26, and waveform B voltage is provided between junction points 26 and 27.

The voltage provided by virtue of dischage of winding 31, shown by waveform A, and the voltage provided by source 20 shown by waveform B, together with the residual charges or initial conditions within primary 31 as well as initial conditions in winding 25 and capacitor 40, will result in currents flowing through primary 31, winding 25 and capacitor 40, so that an intermodulation current due to interaction of these currents in primary 31 winding, a transformer being a non-linear device and by virtue of its core enabling amplitude modulation to take place therein, will create intermodulation of waveforms A and B due to voltages provided across primary 31 and winding 25, to energize by transformer action secondary winding 32 of transformer 30 and feed through wire 33 rotor arm 61 of distributor 60. When distribuoter arm 61 is at a position just before being driven to the leading edge of a corresponding stationary contactor or member 62, the high voltage produced between junction 34 and ground 11 will cause flash over between arm 61 and member 62 and begin to energize one of the corresponding igniters 70 attached to that particular member 62, to maintain the igniter energized for the duration of the intermodulated waveforms A and B.

The cycle just described will repeat for succeeding igniters when timer 50 has its disk 51 driven past the next successive dwell arc paths and corresponding insulating members.

It should also be noted that the system of FIG. 1 had been laboratory verified with computed results obtained.

It is of course obvious that a conventional set of points with a timing cam intermittently activating the points, or other equivalent magnetic pulse or optically activated timer units could be used as a direct substitute for the timer as at 50. However, timer 50 is inexpensive, highly reliable and devoid of contact bounce to make its use from economic and reliability points of view, attractive.

Figure 2:
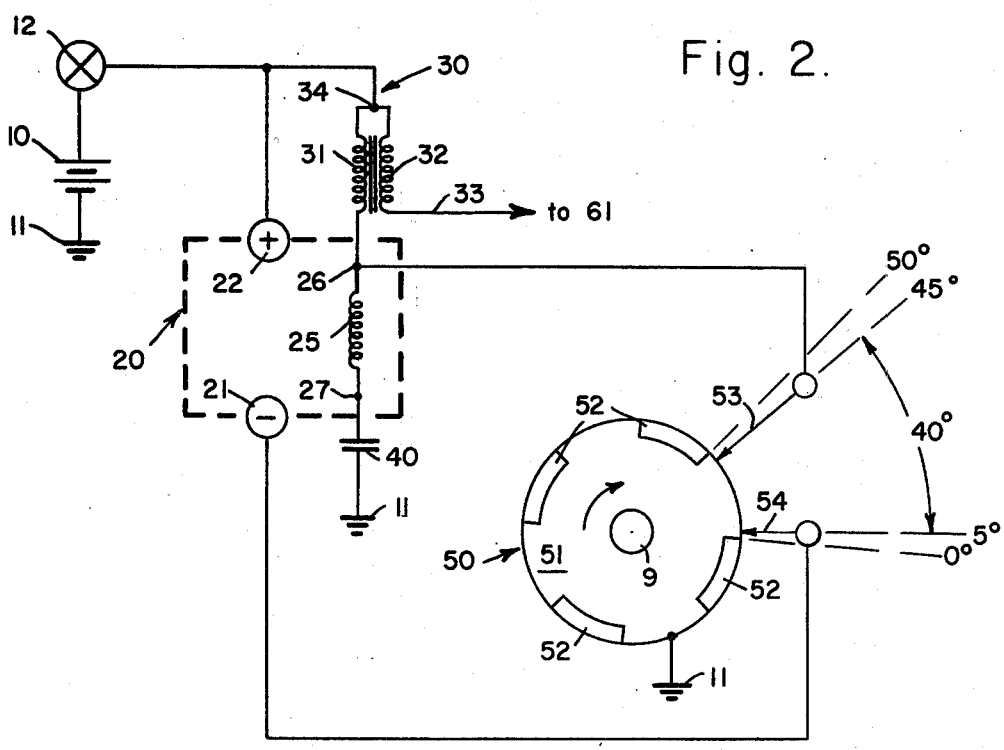
FIG. 2 is a schematic of another configuration of the ignition system according to the invention.

Referring to FIG. 2 and waveforms A and C of FIG. 6, a configuration modifying FIG. 1 and therefore showing a difference between waveform B and waveform C is to be noted.

Such difference in waveforms are prevelant by virtue of the fact that an additional contactor 54 is added to timer 50 in cooperation with disk 51 periphery. Contactor 54 is shown spaced about 40° from contactor 53, in the illustration, at the 5° point of disk 51 position.

Contactor 54 is herein connected to the negative DC power terminal 21 of non-DC source 20, so that DC power is intermittently connected to source 20 as disk 51 is driven. Otherwise, all other connections are the same as in FIG. 1 configuration.

Consequently, DC power is provided to power source 20 during such periods as contactor 54 is in cooperation with the metallic portions of disk 51 periphery, herein shown at locations between 0°–50°and to like locations at the disk 51 periphery as such disk is driven by shaft 9.

Hence, source 20 will be energized during such periods and provide an output voltage between junctions 26 and 27 which output voltage will create a current circulating between output winding 25 and capacitor 40, as discussed above.

It should be noted that the voltage produced at output of winding 25 is not shown in waveform C illustration since it is not usable for intermodulation with waveform A until disk 51 is driven so that contactor 53 is at the 50° point, at which time ground 11 will be disconnected from junction 26, and a transient waveform C representing the change in the circuit current balance, will appear some 5° preceding waveform A. Waveforms A and C will combine or intermodulate and the intermodulated voltage components will be present across primary winding 31 to energize the igniters as hereinabove discussed.

It should also be noted, that the action of timer 50 here, is a make action to energize source 20 prior to break action of disconnecting the DC power from primary 31, and that such action can be simulated with a more complex and less reliable microswitch of the single-pole-double-throw type having delayed break action, or by a suitable magnetic pulse or optical switching timer.

Figure 3:
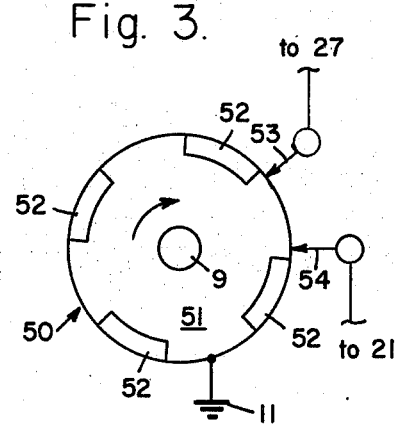
FIG. 3 is a schematic view of another version of the timer as used in the configuration of FIG. 2.

Referring to FIG. 3, the configuration therein of the system is similar to that of FIG. 2 configuration, except that contactor 53 is connected to junction point 27 instead of to junction point 26. Thus in this configuration, DC power is also fed to winding 25 when primary 31 is charged, also establishing initial conditions due to DC power in winding 25 as well. Otherwise, the operation of this configuration is the same as in the case of FIG. 2.

It should be noted that the action of timer 50 here is the same as that of the timer of FIG. 2, and this timer can be replaced with a make-before-break microswitch and cam of suitable design, or by a suitable magnetic pulse or optical switching timer.

Figure 4:
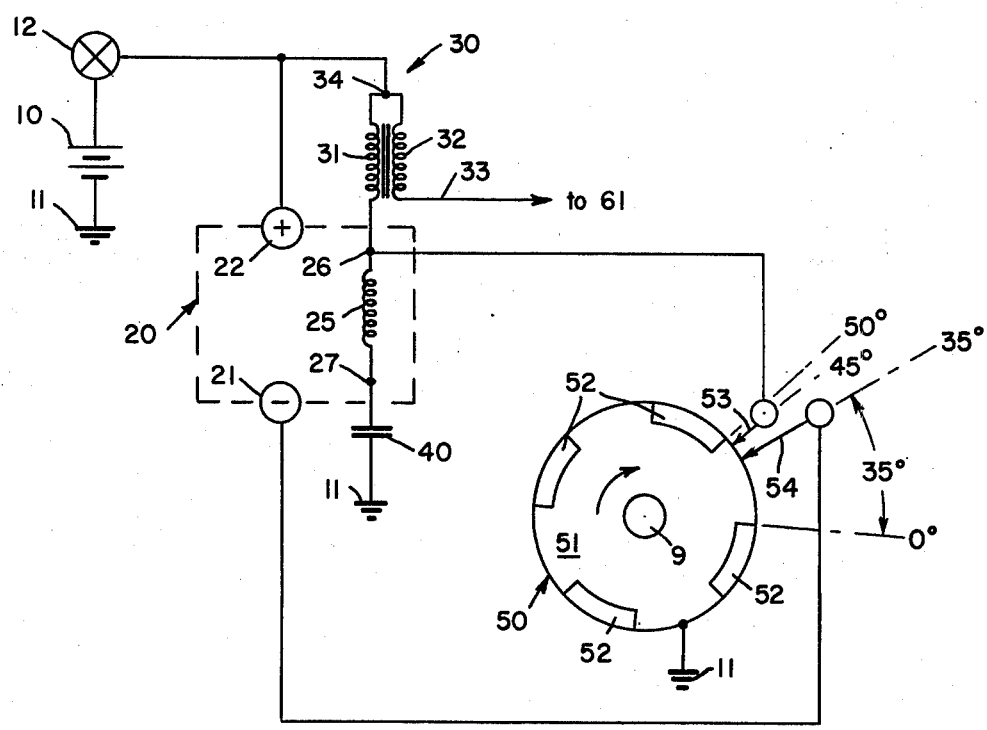
FIG. 4 is a schematic of still another configuration of the ignition system according to the invention.

Referring to FIG. 4 and waveforms A and D of FIG. 6, this configuration differs from the configuration of FIG. 2 only with respect to having contactor 54 positioned at the 35° location of timer disk 51. Such contactor position enables source 20 to have DC power disconnected therefrom some 15° succeeding disconnect of DC power from primary winding 31 so that the power fed by source 20 through winding 25 thereof will be present for a short duration to energize source 20 and yield a decaying transient as at D to intermodulate with transient waveform A, and provide the intermodulated voltage across primary winding 31.

It should be noted that the action of timer 50 here is a break of DC before break of AC power, and such timer can be replaced by a suitably designed microswitch and cam combination, or by a suitable magnetic pulse or optical switching timer.

Figure 5:
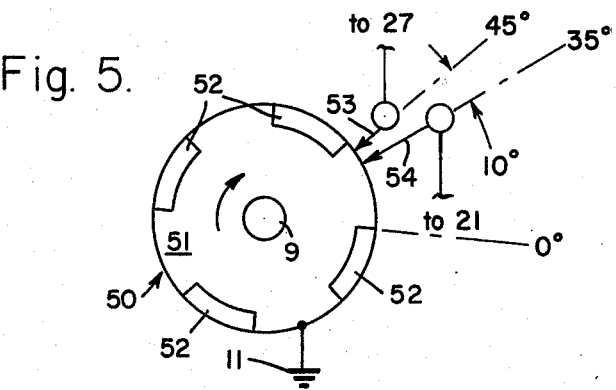
FIG. 5 is a schematic view of another version of the timer usable in the configuration of FIG. 4.

Referring to FIG 5, the configuration is similar to that of FIG. 4, except that contactor 53 is connected to junction 27, instead of junction 26. Thus in this configuration, DC power is also fed to winding 25 when primary 31 is charged, also establishing initial conditions due to DC power in winding 25 as well. Otherwise, the operation of this configuration is the same as that of FIG. 4.

It should also be noted that the timer here is of the break of DC before break of AC power, and such timer can be replaced by a suitable designed microswitch and cam combination if desired, or by a suitable magnetic pulse or optical switching timer.

Though DC power from battery 10 was shown to charge primary 31, it is obvious that AC power derived from an alternator commonly used in the automotive power plant, can be used instead of the battery for the same purpose.

Referring to FIGS. 7a–7d, the solutions for currents and voltages appearing at primary winding 31 of FIGS. 1-5, are mathematically developed and illustrate the functional operation of the inventive system. Tables of parameters, their definitions and conditions of operability of a typical engine under its worst case conditions, namely at high engine speed, can be utilized and included in the equations during the charging mode of inductive components and during discharge mode of such components. The equivalent circuit at (a) is thereby usable to represent the configurations of FIGS. 1-5 for mathematical representation purposes.

Accordingly, at (2), the charge period for the inductor primary 31 at 6000 engine revolutions per minute, would be 1.67 milliseconds, and the discharge period would be 0.833 milliseconds for an 8 cylinder internal combustion engine.

The AC unit at 20 in FIGS. 1-5 has a rectangular waveform voltage output $v_1(t)$ shown at (3). The Laplace transform for such voltage expression is indicated by $v_1(s)$.

The expression for the step function voltage supplied by battery 10 is denoted at (4) by the expression $v_o(t)$ and its Laplace transform by the expression $v_o(s)$.

Typical parameter values encountered in the system and needed to make numerical substitution in the developed mathematical expressions, are listed at (5).

Since it is simpler to develop the total current by superposition principles, the solution for current $i_1(t)$ due to forcing function $v_1(t)$, is first obtained at (6) wherein the parameters used in expression (6) are related to the actual parameters of FIGS. 1-5. The expression for the current due to $v_1(t)$ in Laplace transform is shown at (7) and such current in the time domain, obtained by taking the inverse Laplace transform of (7), is shown at (8). Therein, it can be seen that the current resulting, will have a decaying exponential term and a series of sinusoidal terms.

In similar manner to development of the expression for the current due to forcing function $v_1(t)$, the current expression due to forcing function $v_o(t)$ may be derived. Such derivation is shown at (9), (10) and (11) resulting in a current expressed in terms of time as $i_o(t)$.

The total current in the primary winding circuit $i(t)$ is of course the sum of $i_1(t) + i_o(t)$, and the complete expression thereof is given at (12). However, the first sinusoidal term in (12) is small compared to the other sinusoidal terms therein and may be neglected for an approximation of the total current $i(t)$ as given by expression (13).

The induced voltage in the primary winding of transformer 30, that is in winding 31, is the derivative of the total current therethrough by Faraday's Law of Induction, and hence such induced voltage may be expressed by equations (14) and (15).

Inasmuch as there are two current components that intermodulate in $L_1$ (primary 31) in amplitude modulation fashion, and that such two current components are inherent in the function e(t) as above derived, the actual total modulation voltage for amplitude modulation may be given by a converging infinite series, such as at (16).

It is of course obvious that substituting the parameters as stated at (5) in expression (13) will provide the amplitudes of current at selected time periods, and substituting such parameters in expression (16) will provide the modulation amplitudes at the several selected time periods using only time periods not exceeding those shown at (2), inasmuch as longer time periods are not of interest being beyond the firing cycle modes of the system.

What is claimed is:

1. An ignition system having a transformer with primary and secondary windings, comprising the combination of:

first means coupled to the primary winding for charging same during a first mode of operation of the system;

second means having output means, serially coupled to the primary winding, for providing AC power to the system during a second mode of operation of the system;

a capacitor in series circuit with the output means and primary winding, said capacitor, output means and primary winding forming a primary circuit; and third means, coupled to the primary circuit, for providing a modulated transient ignition voltage at the primary winding during said second mode.

2. The invention as stated in claim 1, wherein said third means includes further means for discharging the primary winding and unshunting the combination of capacitor and output means during said second mode.

3. The invention as stated in claim 2, wherein said third means comprises:

a driven electrically conductive wheel having electrically insulative segments integral with and regularly positioned at the periphery of the wheel; and an electrical contactor in slidable cooperation with the wheel pheriphery.

4. The invention as stated in claim 1, wherein said third means includes further means for discharging the primary winding, unshunting the combination of capacitor and output means and energizing the second means during said second mode.

5. The invention as stated in claim 4, wherein said third means comprises:

a driven electrically conductive wheel having electrically insulative segments integral with and regularly positioned at the pheriphery of the wheel;

a first electrical contactor in slidable cooperation with the wheel periphery; and a second electrical contactor spaced from the first contactor in slidable cooperation with said wheel periphery.

6. The invention as stated in claim 1, wherein said third means includes further means for discharging the primary winding and output means, unshunting the capacitor and energizing the second means during said second mode.

7. The invention as stated in claim 6, wherein said third means comprises:

a driven electrically conductive wheel having electrically insulative segments integral with and regularly positioned at the periphery of the wheel;

a first electrical contactor in slidable cooperation with the wheel pheriphery; and a second electrical contactor, spaced from the first contactor, in slidable cooperation with the wheel periphery.

8. The invention as stated in claim 1, wherein said third means includes further means for discharging the primary winding, unshunting the combination of capacitor and output means and deenergizing the second means subsequent to initiation of discharge of the primary winding during said second mode.

9. The invention as stated in claim 8, wherein said third means comprises:

a driven electrically conductive wheel having electrically insulative segments integral with and regularly positioned at the periphery of the wheel;

a first electrical contactor in slidable cooperation with the wheel periphery; and a second electrical contactor, spaced from the first contactor, in slidable cooperation with the wheel periphery.

10. The invention as stated in claim 1, wherein said third means includes further means for discharging the primary winding and output means, unshunting the capacitor and deenergizing the second means subsequent to initiation of discharge of the primary winding during said second mode.

11. The invention as stated in claim 10, wherein said third means comprises:

a driven electrically conductive wheel having electrically insulative segments integral with and regularly positioned at the periphery of the wheel;

a first electrical contactor in slidable cooperation with the wheel periphery; and a second electrical contactor, spaced from the first contactor, in slidable cooperation with the wheel periphery.

* * * * *